(12) United States Patent
Gardner et al.

(10) Patent No.: US 7,269,504 B2
(45) Date of Patent: Sep. 11, 2007

(54) SYSTEM AND METHOD FOR ASSIGNING A LEVEL OF URGENCY TO NAVIGATION CUES

(75) Inventors: Judith Lee Gardner, Detroit, MI (US); Walton Fehr, Mundelein, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/972,737

(22) Filed: Oct. 25, 2004

(65) Prior Publication Data

US 2005/0256635 A1     Nov. 17, 2005

Related U.S. Application Data

(60) Provisional application No. 60/570,516, filed on May 12, 2004.

(51) Int. Cl.
*G01C 21/30* (2006.01)
*G01C 21/28* (2006.01)
*G09B 29/10* (2006.01)

(52) U.S. Cl. ............ 701/201; 701/209; 701/208; 455/13; 340/995.14; 340/995.18; 340/988; 340/990; 340/995.2; 706/900; 706/913

(58) Field of Classification Search ........ 701/208–211, 701/201; 340/988, 990, 995.1, 989, 995.14, 340/995.18, 995.2; 715/712, 822, 772, 776, 715/821, 823, 852, 855; 455/13; 706/900, 706/913; G06F 165/00, 3/00; G01C 21/34
See application file for complete search history.

(56) References Cited

U.S. PATENT DOCUMENTS 5,987,381 A * 11/1999 Oshizawa .......... 701/209

(Continued)

FOREIGN PATENT DOCUMENTS

CN     1786667 A * 6/2006

(Continued)

OTHER PUBLICATIONS

Ramos et al., A software environment for an autonomous unmanned airship, Proceeding of the 1999 IEEE/ASME, Sep. 19-23, 1999 (pp. 1008-1013).*

(Continued)

*Primary Examiner*—Cuong Nguyen
(74) *Attorney, Agent, or Firm*—Thomas V. Miller; Indira Saladi; Terri S. Hughes

(57) ABSTRACT

System and method for guiding a driver of a vehicle (20) from a starting point to a destination point using an assignment of levels of urgency of navigation cues. The system comprises a navigation unit (38), a controller (22) and a user interface (42). The navigation unit (38) is capable of selecting a route between the starting point and the destination point. The navigation unit (38) is further capable of generating a plurality of navigation cues to guide the driver along the selected route. The controller (22) is connected to the navigation unit (38) and receives navigation cues. The controller (22) has an urgency calculator (40) that is capable of assigning a level of urgency to the navigation cues. The controller (22) may also have a workload manager (60) that is capable of classifying an activity state of the driver as well as updating the level of urgency of the navigation cue. The user interface (42) presents the navigation cues based on the level of urgency of the navigation cues.

34 Claims, 7 Drawing Sheets

U.S. PATENT DOCUMENTS

| | | | |
|---|---|---|---|
| 6,002,397 | A | 12/1999 | Jaaskelainen, Jr. |
| 6,182,010 | B1* | 1/2001 | Berstis ...................... 701/211 |
| 6,212,470 | B1* | 4/2001 | Seymour et al. ......... 340/995.2 |
| 6,337,699 | B1* | 1/2002 | Nielsen ...................... 715/837 |
| 6,606,373 | B1* | 8/2003 | Martin .................... 379/88.01 |
| 6,611,498 | B1* | 8/2003 | Baker et al. ................. 370/252 |
| 6,687,615 | B1* | 2/2004 | Krull et al. ................. 701/210 |
| 6,813,558 | B1* | 11/2004 | Lapstun et al. ............. 701/202 |
| 6,845,319 | B2* | 1/2005 | Uchida ....................... 701/208 |
| 6,856,899 | B2* | 2/2005 | Krull et al. ................. 701/209 |
| 6,889,138 | B1* | 5/2005 | Krull et al. ................. 701/211 |
| 6,892,135 | B1* | 5/2005 | Krull et al. ................. 701/211 |
| 7,027,808 | B2* | 4/2006 | Wesby ........................ 455/419 |
| 7,086,089 | B2* | 8/2006 | Hrastar et al. ................. 726/22 |
| 7,113,085 | B2* | 9/2006 | Havekost .................... 340/506 |
| 2001/0051985 | A1* | 12/2001 | Haverstock et al. ........ 709/206 |
| 2002/0054587 | A1* | 5/2002 | Baker et al. ................. 370/352 |
| 2002/0055790 | A1* | 5/2002 | Havekost ..................... 700/80 |
| 2002/0091473 | A1 | 7/2002 | Gardner |
| 2002/0116156 | A1 | 8/2002 | Remboski |
| 2002/0120371 | A1 | 8/2002 | Leivian |
| 2002/0120374 | A1 | 8/2002 | Douros |
| 2002/0138180 | A1 | 9/2002 | Hessing |
| 2002/0151297 | A1 | 10/2002 | Remboski |
| 2003/0158660 | A1* | 8/2003 | Krull et al. ................. 701/209 |
| 2003/0195701 | A1* | 10/2003 | Ohler .......................... 701/209 |
| 2003/0204308 | A1* | 10/2003 | Uchida ....................... 701/209 |
| 2004/0132432 | A1* | 7/2004 | Moores et al. .............. 455/413 |
| 2004/0153239 | A1* | 8/2004 | Krull et al. ................. 701/209 |
| 2005/0144572 | A1* | 6/2005 | Wattenberg et al. ........ 715/822 |
| 2005/0256635 | A1* | 11/2005 | Gardner et al. ............. 701/201 |

FOREIGN PATENT DOCUMENTS

| | | |
|---|---|---|
| EP | 1024347 A1 * | 8/2000 |
| WO | WO 2005114108 A2 * | 12/2005 |

OTHER PUBLICATIONS

Andrew J. May et al., Pedestrian navigation aids: information requirements and design implications, Pers Ubiquit Comput (2003) 7:331-338, published online Nov. 5, 2003.*

Rebecca Day, Mobile: Navigation—The integrated vehicle of the future, May/Jun. 1999 (from http://www.ce.org/publications/vision/1999/mayjun/.*

Raviv et al., The visual looming navigation cue: a unified approach, Computer Vision and Image Understanding, vol. 79 Issue 3, Sep. 2000, pp. 331-363 (from http://www.sciencedirect.com/ 2 pages).*

Kundur, S. R. et al., An image-based visual-motion-cue for autonomous navigation, in Computer Vision and Pattern Recognition, 1997, Proceeding Computer Society Conference, Jun. 17-19, 1997 (from http://ieeexplore.ieee.org/xpls/ 1 page).*

Thuresson, Japan steers American autos into the future: wireless car navigation systems spread to the States, Jun. 2003, from http://www.findarticles.com/ 3 pages.*

Dr. Marty Bernard, The potential impact on smart technology on station/shared car programsNAEVI 1999, Atlanta, Georgia (from http://evworld.com/archives/conferences/naevi99/mbernard.html—4 pages).*

* cited by examiner

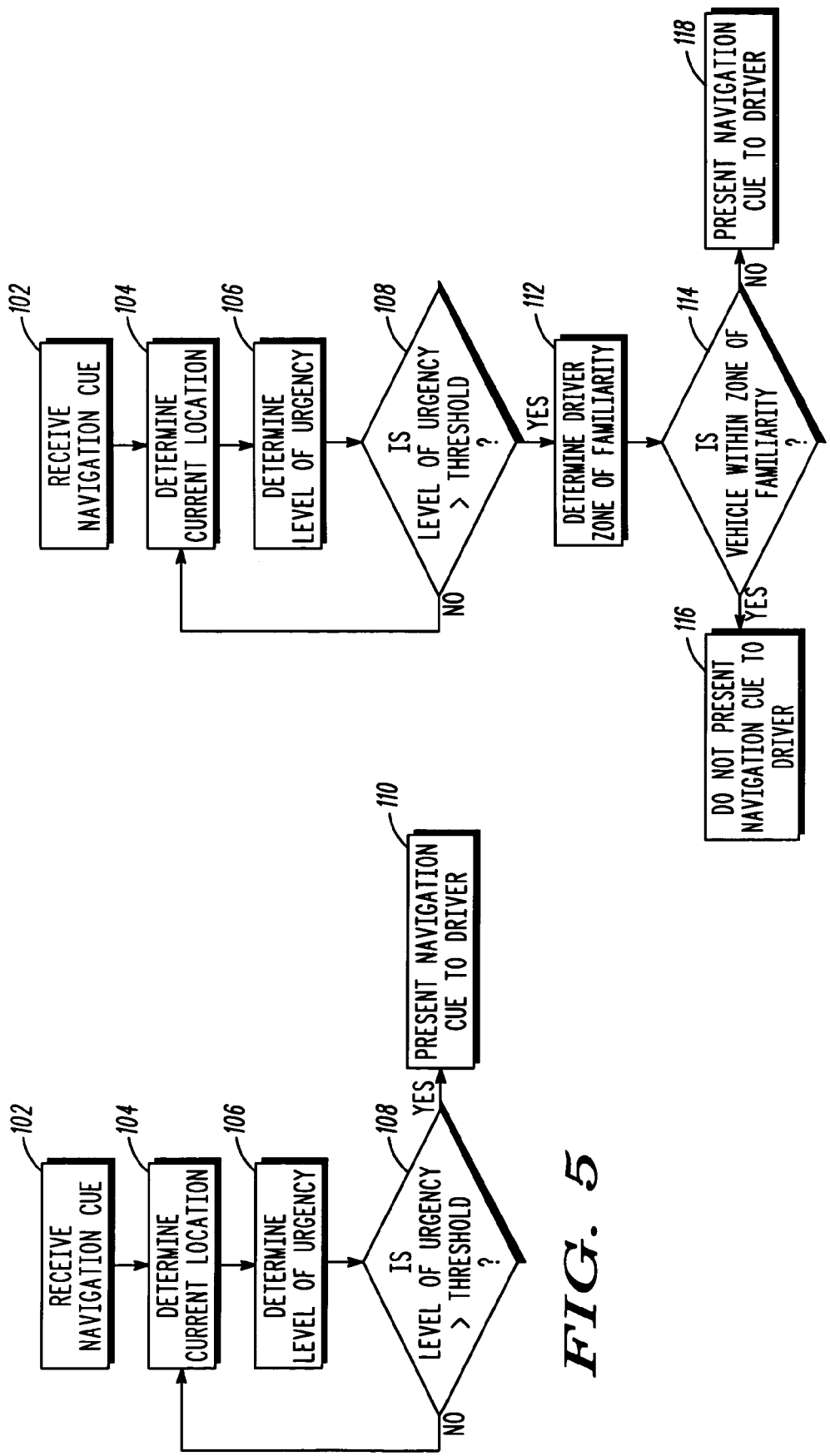

SYSTEM AND METHOD FOR ASSIGNING A LEVEL OF URGENCY TO NAVIGATION CUES

The present application claims priority from provisional application, Ser. No. 60/570,516, entitled "System and Method for Assigning a Level of Urgency to Navigation Cues," filed May 12, 2004, which is commonly owned and incorporated herein by reference in its entirety.

FIELD OF THE INVENTION

This invention in general relates to a navigation system and method for vehicles and, more particularly, to a system and method that assigns a level of urgency to navigation cues.

BACKGROUND OF THE INVENTION

Systems and devices that provide navigation guidance to a driver in a vehicle are well known. In one type of conventional system, a navigation unit is installed in the vehicle. The navigation unit typically has an interactive visual screen or buttons that allows a driver to enter a desired destination location. The navigation unit has memory or a CD drive that keeps map data and a processor that generates routes based on the map data and a desired destination. The navigation unit will calculate a route and then present navigation instructions to the driver through a user interface.

Other known systems include server-based navigation systems. A server-based navigation system has a remote server that downloads information to the vehicle through a wireless communication link. The downloaded information contains the topology or other attributes relating to a calculated route. The information downloaded from the server is also presented to the driver through a user interface.

There is a need to reduce the amount of information presented to drivers while operating a vehicle. At present, any information presented to the vehicle operator, including navigation instructions, is presented without taking into account the various demands that a driving task might be to the operator at a given moment. For example, a navigation system may display an upcoming maneuver or give a verbal description of the maneuver at the same time a driver is putting a CD into the stereo system, or while a driver is operating a power window, or while a driver is engaging in a cellular telephone call.

Human beings have a finite ability to perceive the environment, to attend to elements of the environment, to cognitively process the stimuli taken in, to draw appropriate meaning from perceptions, and to act appropriately upon those perceived meanings. Furthermore, there is a great variation within the driving population in both native and developed abilities to drive. Thus, vehicle operators are subject to confusion, distraction, and to ignorance, which is exacerbated by the barrage of stimuli they are now subjected to while operating a vehicle. Training, experience, and technology can be used to mitigate confusion, distraction, and ignorance.

Unfortunately, in the United States there is little formal or informal training in the skills involved in driving, beyond the period when people first apply for their licenses. Driver training programs have not proven to be particularly effective, nor is training continued through the driving career. In fact, in the United States, in particular, most people think of driving as a right rather than a privilege. Further, studies show that most think of themselves as good drivers and of "the other person" as the one who creates problems. Unless and until a cultural or legal change takes place that encourages drivers to improve their driving skill, it seems that technological solutions designed to minimize confusion, distraction, and ignorance have the best potential for improving the safety of the highway transportation system.

To address these and other safety concerns, an integrated safety system based on a state transition model has been proposed. The underlying concept is a "hierarchy of threat" model that steps through a series of states each one representing an assessment of the danger of an impending collision based on information from external object detectors and in-vehicle sensors. The states are "normal driving state," "warning state," "collision avoidable state," "collision unavoidable state," "post-collision state." Sensor and data fusion algorithms combine information from the sensors and determine the degree to which the danger of collision exists. If the system detects the danger of a collision it issues warnings to the driver or, in some situations, takes control of the vehicle and initiates automatic braking, automatic lane change, or other forms of vehicle control. This system represents an attempt to bring previously unrelated sensor information into an integrated state from which useful inference about the danger of collision may be made and warnings to the driver, or actual control of the vehicle, can be used to avoid completely or mitigate the damage from a collision.

There has also been proposed a system that provides extensive monitoring of the vehicle and traffic situation in order to prioritize presentation of information to the driver. The goal of this system is to manage the stream of information to the driver while taking account of the driving task, conditions, and the physical, perceptual and cognitive capacities of the driver. The support provided is designed to improve the driver's focus and to re-focus the attention of a distracted driver as the driver undertakes navigation, maneuvering and control of the vehicle. The overall system architecture incorporates an analyst/planner that accepts inputs from sensors, includes a stored repertoire of driving situations, and records information about the driver. Additionally, the system includes a dialogue controller for managing communication with the driver. The system also monitors the driver and integrates the driver's condition into the decisions made by the warning and control system.

In the particular area of route navigation and guidance systems, none of the existing systems undertake the presentation of navigation instructions based on an urgency of the instruction and the dynamic conditions of the vehicle or driver. These systems also fail to consider whether the driver is familiar with a part of the route. For example, a selected route might start at the driver's home and take the driver to a distant location. The navigation instructions that form a part of the trip in the proximate area of the driver's house may be of little assistance because the driver is familiar with the area.

Moreover, none of the existing systems undertake the modification or modulation of navigation instructions based on the monitoring of a range of sensor data, nor do they provide for evaluation of the driver's cognitive load. Such systems additionally fail to consider the driver's activity in the cockpit that is not directly related to the driving task such as opening and closing windows, tuning the radio, etc. Thus, these systems do not provide information in synchronization with the driving task, nor do they attempt to minimize distractions that may be associated with the navigation instructions.

It is, therefore, desirable to provide an improved navigation system and method to overcome or minimize most, if not all, of the preceding problems.

BRIEF DESCRIPTION OF THE DRAWINGS

FIGS. 5–6 illustrate various methods of the present invention for assigning a level of urgency to a navigation cue;

FIG. 10 is a flow diagram illustrating another embodiment of a method performed in the navigation unit to process the points received from the service center.

Figure 1:
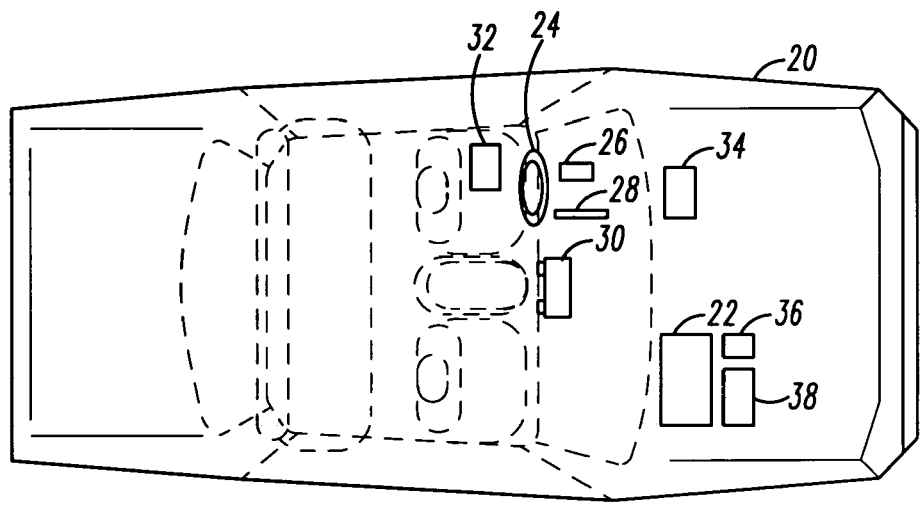
FIG. 1 is a top view of a vehicle in one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described are navigation systems and methods for vehicles to dynamically assign a level of urgency to navigation cues. The systems and methods dynamically reduce the amount of navigation information presented to the driver while operating the vehicle.

Turning to the drawings, FIG. 1 illustrates a vehicle 20 that includes a controller 22 and various visible and hidden apparatus used for monitoring vehicle and driver operations. Shown in the vehicle is a steering wheel 24, a brake pedal 26, an accelerator 28, an entertainment unit 30, a driver seat 32, a vehicle electronic control unit 34, a positioning unit 36, and a navigation unit 38. Other vehicle controls used, but not depicted, in various embodiments may include a turn signal, gear shifter, door handles, and window controls, among others. The controller 22 is connected to sensors (not shown) that monitor and report the status and operation of the various vehicle components 24, 26, 28, 30, as well as receive information and data from the vehicle electronic control unit 34, the positioning unit 36 and the navigation unit 38 as discussed below.

Figure 2:
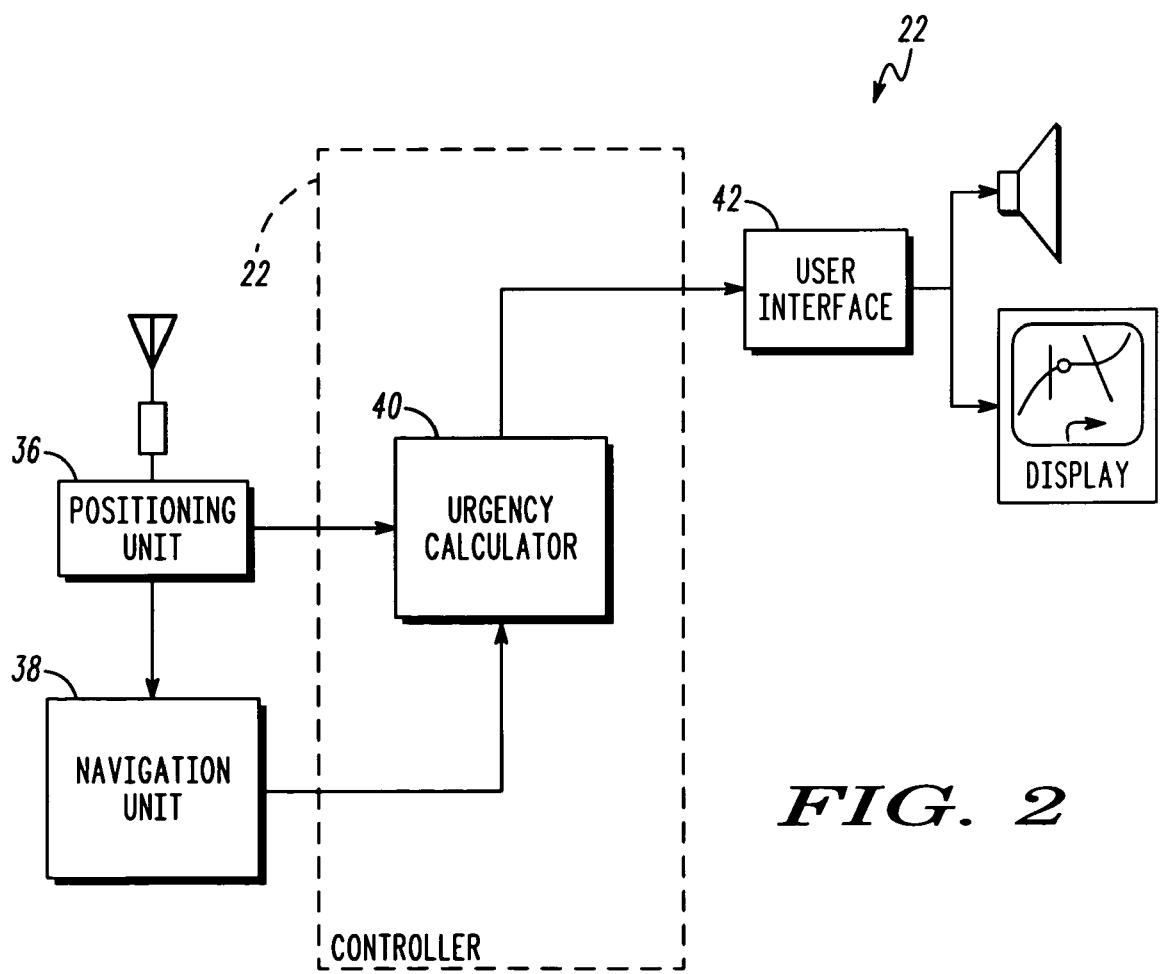
FIG. 2 is a block diagram of one embodiment of a controller of the present invention connected to a navigation unit embedded in the vehicle.

FIG. 2 illustrates one embodiment of a controller 22 having at least an urgency calculator 40 that is connected to a positioning unit 36, a navigation unit 38 and a navigation user interface 42. The navigation unit 38 receives a starting point and a destination point and generates a route to guide the operator of the vehicle from the starting point to the destination point. The starting point and destination point may be entered by the user through a user input. Alternatively, the starting point may be obtained through data received from the positioning unit 36 that reflects the current position of the vehicle. The positioning unit 36 may be a Global Positioning System (GPS) device or other device or system that determines the location of the vehicle 20.

In response to receiving the starting point and destination point, the navigation unit 38 selects or otherwise determines a route. To select a route, the navigation unit 38 may use digital map data and a route generation engine. These types of devices are known in the art. Additionally, the navigation unit 38 will determine a set of navigation cues associated with specific maneuvers along the selected route. The navigation cues along the route may be guidance cues, preparation cues, warning cues, and specific maneuver cues. The navigation cues help guide, prepare, warn, and instruct the user toward the destination point. In the present invention, the navigation unit 38 should generate data messages or packets associated with each navigation cue. In one embodiment, the generated data messages or packets for each navigation cue may include at least the coordinates of a maneuver and an instruction for the maneuver. The instruction for a maneuver may comprise a voice, text, or graphical message to be outputted to the operator of the vehicle 20. The present invention will output one or more of these messages (in whole, in part, or in a modified format) to the operator of the vehicle based on a level of urgency of the navigation cue as described further below. Additionally, the data generated by the navigation unit 38 for some or all the cues may further include an identification of the type of navigation cue that may also be used to determine the level of urgency of the navigation cue.

Figure 3:
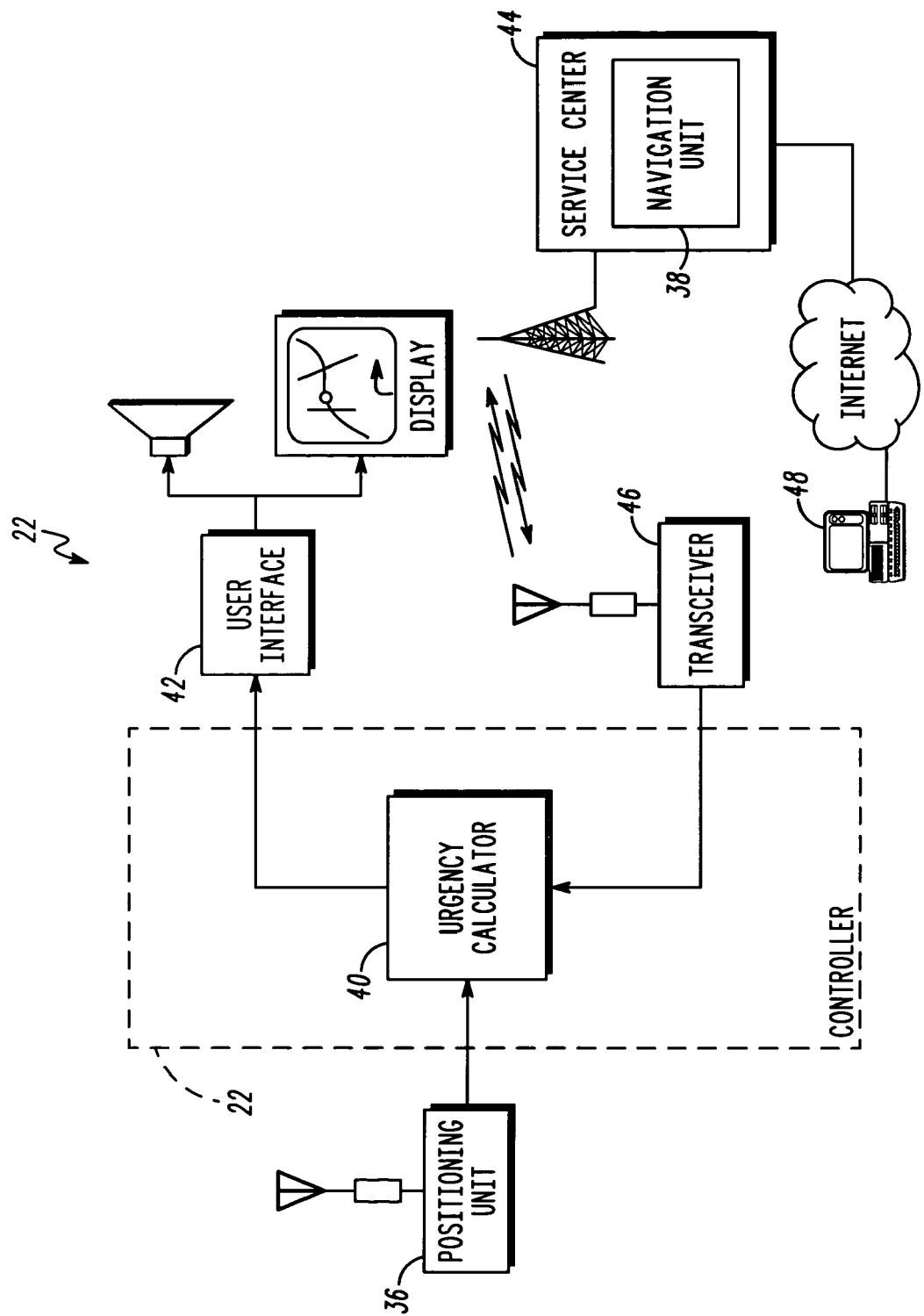
FIG. 3 is a block diagram of another embodiment of a controller of the present invention that is wirelessly connected to a navigation unit in a remote service center.

FIG. 3 illustrates another embodiment of a controller 22 having at least an urgency calculator 40 but places the navigation unit 38 in a remote service center 44. Here, the navigation unit 38 communicates with the vehicle 20 via a wireless communication link over a wireless transceiver 46. The wireless communications are illustrated in FIG. 3 by communication arrows. Generally, the remote service center 44 will receive a starting point and a destination point from either the vehicle 20 or another device (such as a personal computer 48) that is connected to remote service center 44. Those of ordinary skill in the art, having the benefit of this disclosure, will appreciate that many possible wireless communication methods may be used for communications between the vehicle 20 and the remote service center 44. In one embodiment, the communications are via a cellular wireless communication such as AMPS, CDMA, GSM or TDMA. The transmissions between the vehicle 20 and the remote service center 44 may also be made by other wireless communications such as a satellite communications.

One benefit of having the navigation unit 38 in a remote service center 44 is that it can facilitate better access to current map data. Additionally, the remote service center 44 may be configured to incorporate additional services into route generation such as receiving current traffic information from a service provider or other current traffic source. In that case, the selected route may also include a consideration for current traffic patterns. After selecting a route, the navigation unit 38 in the remote service center 44 will also determine a set of navigation cues associated with specific maneuvers along the selected route. Similar to the embodiment described above in relation to FIG. 2, the navigation cues along the route may be guidance cues, preparation cues, warning cues, and specific maneuver cues. The navigation cues may comprise data messages or packets associated with each navigation cue. The navigation cue and associated data is encoded and then transmitted by the service center 44 to the vehicle 20 over a wireless communication link.

In any event, whether the system is vehicle based or server based, the navigation cue and associated data generated by the navigation unit 38 are received by the controller 22. In particular, in one embodiment, the urgency calculator 40 in the controller 22 will receive each navigation cue and assign a level of urgency associated with the navigation cue. The urgency calculator 40 may include a suitable processing device, such as a microprocessor, digital signal processor, etc., one or more memory devices including suitably configured data structures, and interfaces to couple the urgency calculator 40 to various components such as the navigation unit 38 and positioning unit 36. The urgency calculator 40 may be an integrated single module or its functions may be performed as part of another vehicle computer system such as a navigation controller, an engine controller, body controller or entertainment controller.

In one embodiment, the urgency calculator 40 determines a level of urgency according to the time and distance that the vehicle 20 is from a particular maneuver. For instance, the urgency calculator 40 will assign a lower level of urgency for the navigation cue if the vehicle 20 is located 1000 meters from a maneuver than if the vehicle 20 is located 200 meters from a maneuver. Here, the urgency calculator 40 will use positional data received from the positioning unit 36 and the location of the maneuver in the data packet associated with the navigation cue.

Additionally, or in the alternative, the urgency calculator 40 may assign a level of urgency based on the type of navigation cue generated by the navigation unit 38. For instance, as mentioned above, specific navigation cues may be divided into different categories such as a general guidance cue, a preparation cue, a warning cue, and a specific maneuver cue. Each of these cues may represent navigation instructions or guidance about upcoming maneuvers at different distances from the maneuver. In this case, a specific maneuver cue ("turn right at next exit") may have a higher level of urgency than a general guidance cue ("continue east on I-94 for 14 miles and prepare to take Exit 79 at Chalmers Road"). As a result, navigation cues having a relatively lower level of urgency may be delayed, ignored, or modified when the driver is extremely busy with a particular driving task, such as traversing through a construction zone.

In another embodiment, the urgency calculator 40 may assign a level of urgency based on a driver's zone of familiarity within a geographic territory, an area, or a portion of a route. For instance, in one embodiment of the present invention, the driver may personally input zones of familiarity using a home personal computer 48 (such as the one shown in FIG. 3) or other device connected to the navigation unit 38. Here, the navigation unit 38 would present a route to a person and a user interface can be used by the driver to designate or select a geographic territory, an area, or a portion of the route as being familiar to the driver. For example, there may be a "familiar" zone in which the driver has good confidence that they would recognize the sites within the zone.

The user interface may also be configured to allow the driver to designate different levels of familiarity which, in turn, would affect the level of urgency associated with navigation cues in a particular zone. For instance, a relatively low level of urgency could be associated with navigation cues within regions that the driver believes they could navigate without error. A middle level of urgency could be associated with navigation cues within regions that the driver is familiar with major streets/landmarks and capable of negotiating through a neighborhood without instruction. A higher level could be associated with navigation cues in regions that the driver is only familiar with major freeways and able to navigate with only the assistance of highway markings. Everything else could then be designated as a significantly higher level based on unfamiliar territory.

The varying levels of urgency for "zones of familiarity" may also be coupled into the time and distance determinations described above. For instance, the varying levels may be initial levels of urgency assigned to a navigation cue that are capable of escalating or de-escalating depending on the time and distance of the vehicle 20 from the particular maneuver. Alternatively, when a driver reaches different zones that have varying levels of urgency, the system could escalate or de-escalate a level of urgency that was originally based on time and distance from a maneuver.

Once the driver has designed particular zones of familiarity, those designations are used by the controller 22 to infer whether particular instructions are likely needed by the driver along a selected route. In one embodiment, as described above, the zones of familiarity may be managed by the urgency calculator 40 in the process of assigning a level of urgency.

Figure 4:
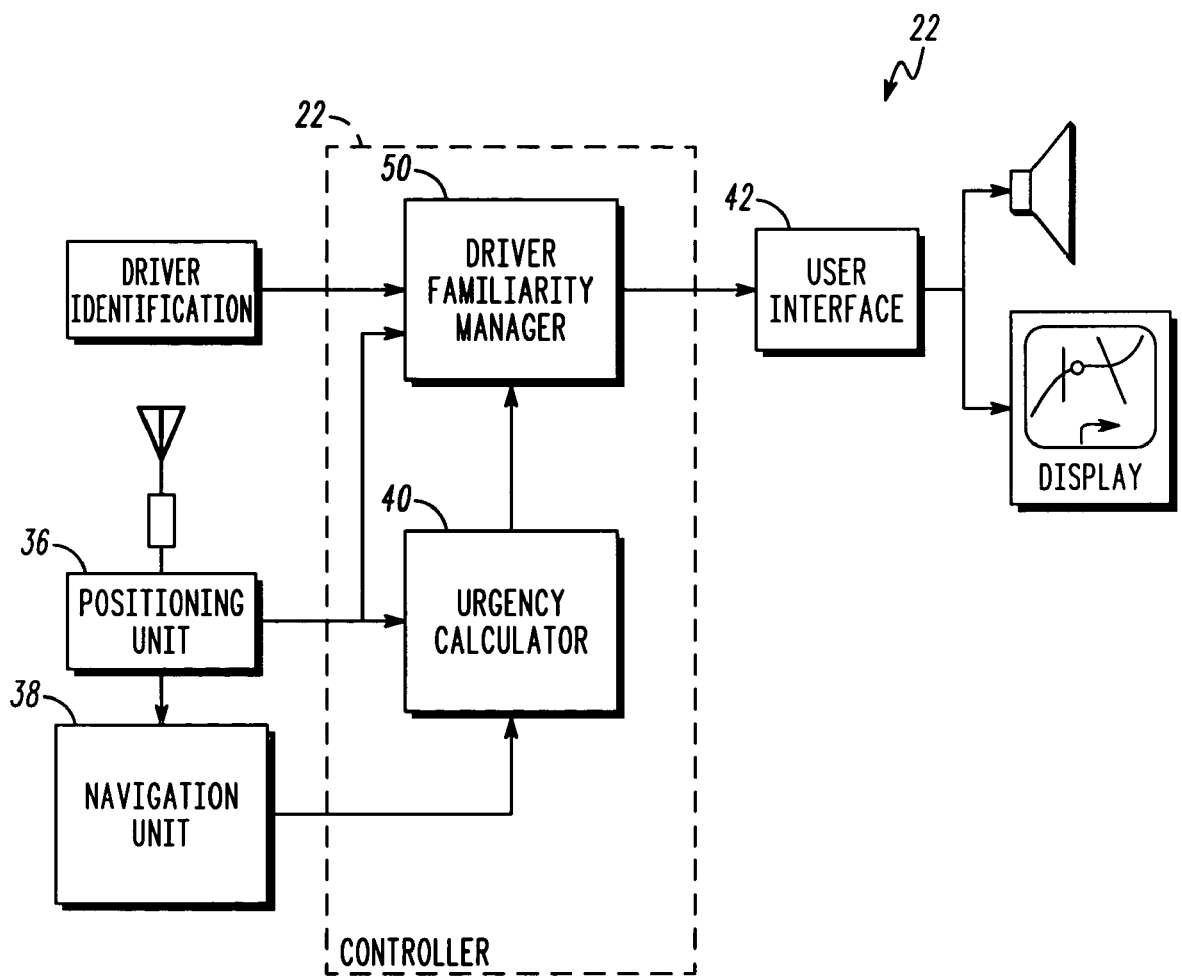
FIG. 4 is a block diagram of a further embodiment of a controller of the present invention that includes a driver familiarity manager.

In another embodiment, the zones of familiarity may be included as a separate function within the controller 22 as shown in FIG. 4 by the addition of a driver familiarity manager 50. Here, the driver familiarity manager 50 may receive an identification of a particular driver of the vehicle 20. The driver familiarity manager 50 may "recognize" a particular user based on a driver identification input 52 or other action by the driver, such as a particular smart card or key fob used by the driver. The smart card or key fob code can either constitute the user identification or can be used to retrieve the identification from either a vehicle's head unit or a communications server. Also, a switch may be dedicated to inputting the user identification, or may comprise switches also serving other functions, such as seat adjustment of the vehicle. The user identification can also be loaded using a display associated with the user interface. Additionally, the user identification may also be retrieved using a voice recognition module, which allows for loading of the communication profile without the necessity of pressing switches.

In any event, based on the recognition and identification of the driver, the driver familiarity manager 50 would access a user profile about the driver that includes any zones of familiarity. In addition to any stored information inputted by the user, the user profile may be configured to store information associated with a machine learning algorithm that is configured to monitor and learn when a driver has become more familiar with a particular geographic region, area, or segment of road.

For instance, the controller 22 may include memory that keeps track of the number of times that a particular driver drove through a particular route or segment of road. Once the driver had driven above a predetermined number of times along a particular route or segment of road, the driver familiarity manager 50 would designate the particular route or segment of road as being within a zone of familiarity. This may result in lowering the level of urgency of any subsequent navigation cues that are associated with maneuvers within the zone of familiarity.

FIG. 5 illustrates a summary of the operation of the controller 22 in one embodiment of present invention. In block 102, the urgency calculator 40 of the controller 22 receives a navigation cue from the navigation unit 38. As mentioned above, this navigation cue may be sent from a navigation unit 38 embedded in the vehicle or may be transmitted over a wireless communication link from a remote service center 44. The navigation cue may include data such as a location of a maneuver, the instructions associated with the maneuver, and the type of maneuver.

After the controller 22 receives the navigation cue; in block 104, in one embodiment, the urgency calculator 40 determines the current location of the vehicle 20. This can be done by receiving data from the positioning unit 36 (such as an on-board navigation system utilizing GPS technology), or location information may be provided by a wireless communication device (e.g., a cellular telephone) and associated wireless communication network.

In block 106, the urgency calculator 40 of the controller 22 will determine a level of urgency associated with the navigation cue. In one embodiment, this is done by having the urgency calculator 40 compare the current location of the vehicle 20 to the location of the maneuver in the associated data of the navigation cue. In this case, the urgency calculator 40 will assign a lower level of urgency for the navigation cue if the vehicle is located relatively far from the maneuver. As mentioned above, there are other ways to assign a level of urgency to a navigation cue including an assessment of navigation cue types, user initiated zones of familiarity, and machine initiated zones of familiarity.

At decision block 108, the controller 22 will then determine whether the level of urgency is greater than a predetermined threshold. The predetermined threshold is implementation specific and may depend on the number of devices communicating with the driver and the number of possible driver operations. If it is determined that the level of urgency is not greater than the predetermined threshold, the process will return to blocks 104 and 106 to determine a new level of urgency for the navigation cue. These steps advantageously allow the system to dynamically update the level of urgency associate with particular navigation cues. In this embodiment, when the level of urgency is greater than the predetermined threshold, the navigation cue is then presented to the driver as shown in process block 110.

When presenting a navigation cue to a driver of a vehicle, the system may be configured to play an associated navigation message in whole, in part, or in a modified format based on the varying level of urgency associated with the navigation cue. For instance, a particular navigation message associated with a navigation cue may be a voice, text, or graphic message. As the level of urgency escalates, the system may be configured to shorten the verbal navigation message to make it more direct or the tone or volume of the verbal message may be increased. Additionally, if the message is text or graphic, the color of the displayed text or graphic may change color depending on the escalation or de-escalation of the level of urgency. Moreover, the complexity of the navigation message for a particular navigation cue may be reduced and highlighted as the level of urgency escalates.

FIG. 6 illustrates a summary of an alternative operation of the controller 22 in another embodiment of present invention. Here, process blocks 102, 104, 106, and 108 are essentially the same as those in FIG. 5. However, if it is determined that the level of urgency is greater than a predetermined threshold, the process continues to block 112 where the controller 22 will determine the driver's zone of familiarity. As mentioned above, this may be done through the addition of a driver familiarity manager 50 that maintains a profile on specific drivers of the vehicle based on user input and/or user habits.

At decision block 114, the process will then determine whether the vehicle is within a zone of familiarity. If so, in one embodiment, the controller 22 will not pass the navigation cue to the user interface 42 for presentation to the driver (block 116). However, if the vehicle is not within the driver's zone of familiarity, the controller 22 will pass the navigation cue to the user interface 42 for presentation to the driver (block 118).

Alternatively, the determination of the zones of familiarity could be tied into the level of urgency determination. For instance, the level of urgency could be escalated or de-escalated based on the driver's zone of familiarity. In this case, if the level of urgency is not above a threshold, then the process may return to block 104 to determine a new vehicle location and new level of urgency.

Figure 7:
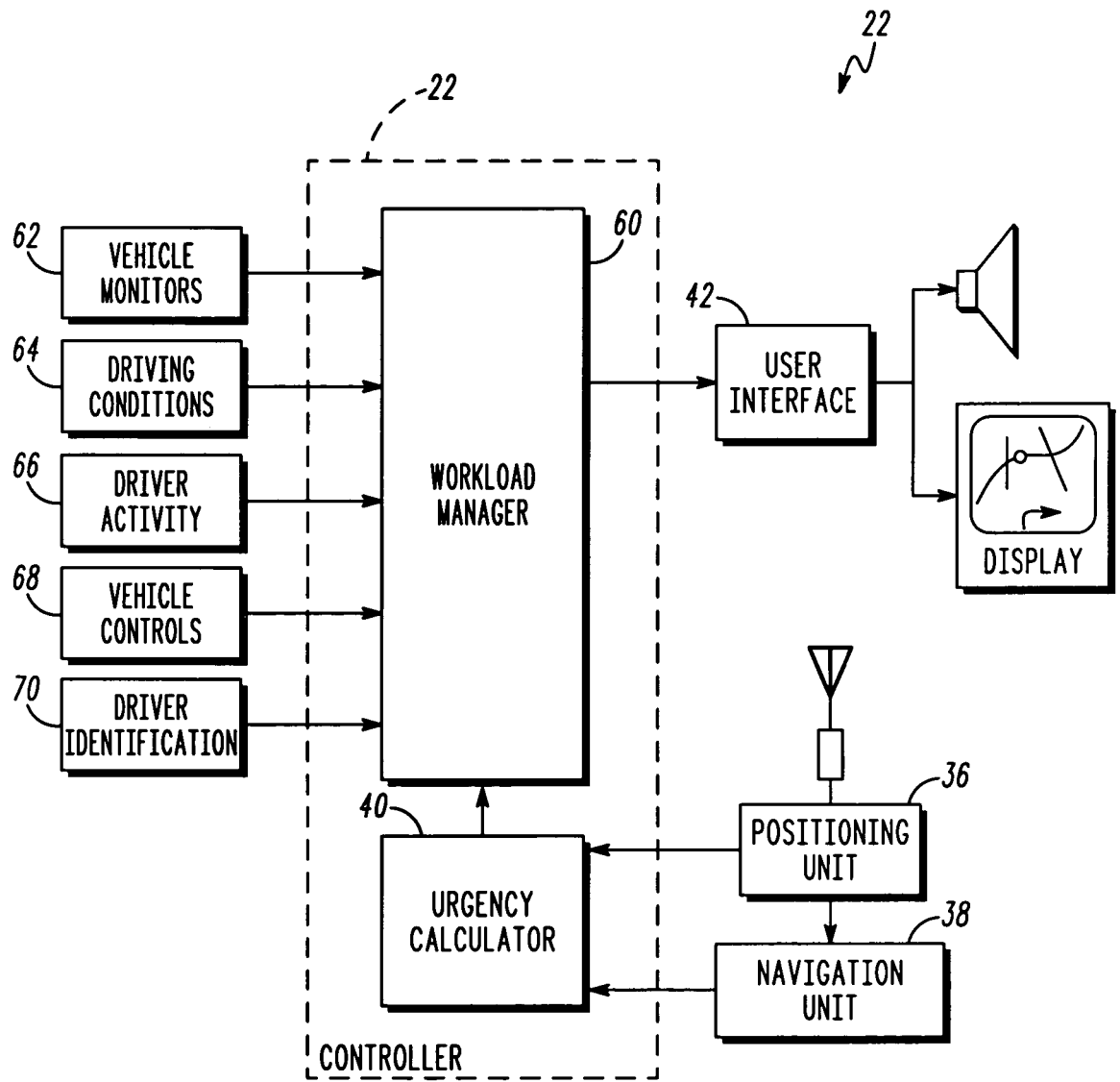
FIG. 7 is a block diagram of another embodiment of a controller of the present invention that includes a workload manager.
Figure 8:
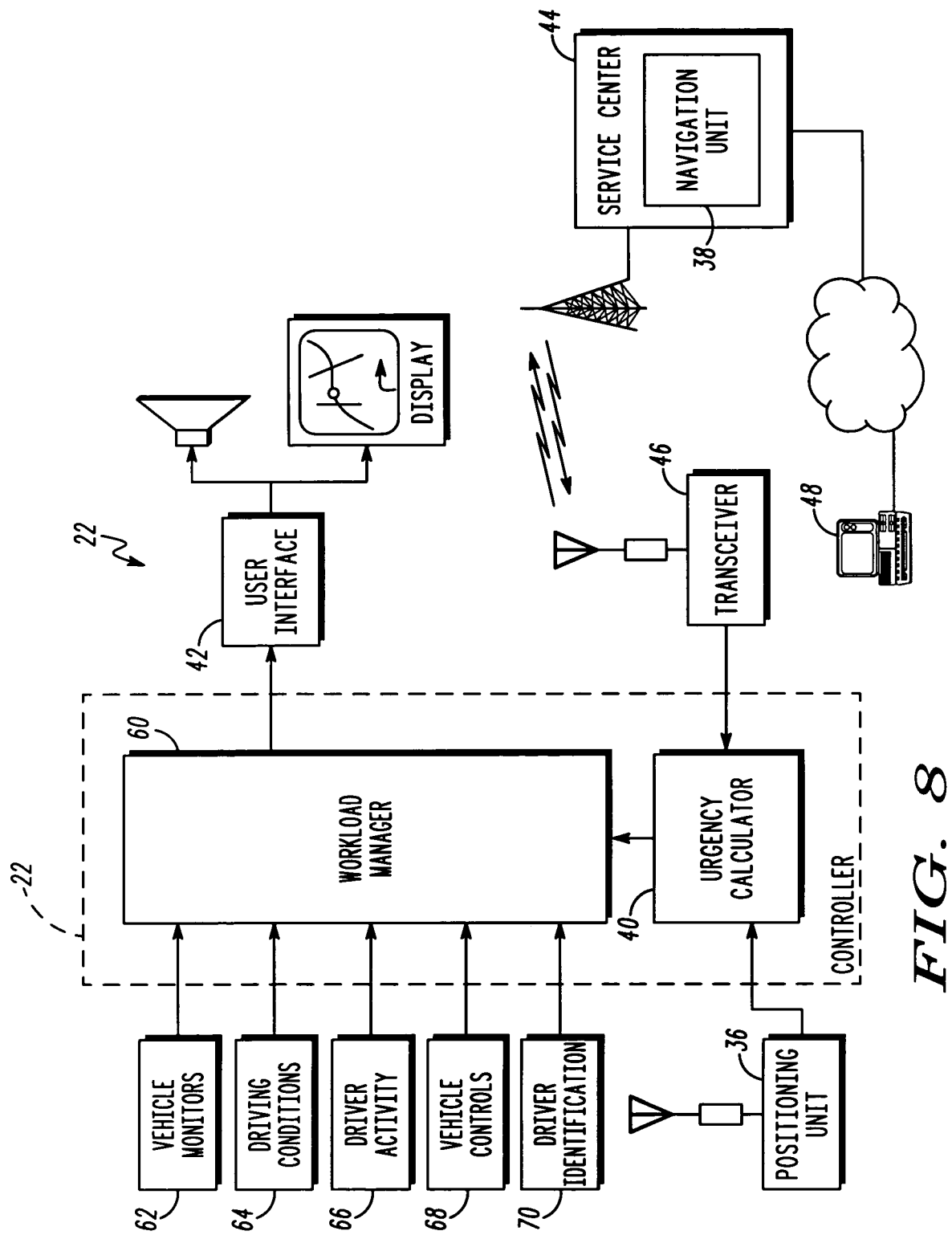
FIG. 8 is a block diagram of a further embodiment of a controller of the present invention that includes a workload manager.

FIGS. 7–8 illustrate another embodiment of a controller 22 having at least an urgency calculator 40 and a workload manager 60. Here, the controller 22 is connected to a positioning unit 36, a navigation unit 38, and a navigation user interface 42. Similar to the embodiments described above, the navigation unit 38 receives a starting point and a destination point and generates a route to guide the operator of the vehicle from the starting point to the destination point. In addition to generating a route, the navigation unit 38 will also generate a set of navigation cues associated with specific maneuvers along the selected route. FIG. 7 shows the navigation unit 38 embedded in the vehicle 20. FIG. 8 shows the navigation unit 38 located in a remote service center 44.

The embodiments in FIG. 7–8 differ from those in FIGS. 2–3 in that the controller also includes a workload manager 60. The workload manager 60 is configured to classify an activity state of the driver of the vehicle 20 and, as explained below, the user interface 42 will present the navigation cue to the driver based on the activity state of the driver. For instance, in one embodiment, the workload manager 60 will classify the driver into at least one activity state based upon sensor data from the vehicle 20 that relates to a vehicle operating condition. The workload manager 60 may also classify the driver into at least one activity state based upon sensor data from the vehicle 20 that relates to a condition of the driver. In particular, the system is adapted to access information related to a vehicle's operation and information related to other possible distractions to a driver and to provide an output for the determination of whether a particular navigation cue is presented, in whole or in part, to the driver. Here, the presentation of a particular navigation cue is based upon a number of conditions relating to the vehicle operation, the vehicle environment, and the activity of the operator and other occupants.

In one embodiment, the workload manager 60 has a multiple inputs 62, 64, 66, 68, and 70. In practice other configurations are likely. The inputs may be bussed, multiplexed, a packet interface or individual conductors. The functions of the workload manager 60 are not affected by the physical layer interface.

The workload manager 60 may include a suitable processing device, such as a microprocessor, digital signal processor, etc., one or more memory devices including suitably configured data structures, and interfaces to couple the workload manager 60 to various vehicle sensors and to provide classification information to the user interface 42. The workload manager 60 may be an integrated single module or its functions may be performed as part of another vehicle computer system such as a navigation controller, an engine controller, body controller or entertainment controller.

As shown, the data is captured from a variety of sources, all of which may be used directly or indirectly to infer the state of the vehicle and, moreover, the driver's cognitive load with respect to new inputs. Such data encompasses data produced by the various vehicle sensors. Vehicle condition monitoring sensors are pervasive in passenger vehicles (cars, mini-vans, sport utility vehicles, etc.) and many other vehicles. These sensors monitor numerous parameters such as engine operating parameters, vehicle speed, transmission and wheel speed, vehicle acceleration in three axes, chassis function, emission control function, etc. These sensors may also provide data related to vehicle diagnostics.

Vehicle monitors 62 encompass data related to the environment in which the vehicle is operating, e.g., the road conditions, traffic conditions, weather, etc. The vehicle monitors 62 may include sensors that also provide vehicle-operating data. Vehicle location, another element of vehicle monitors 62 may be provided by an on-board navigation system utilizing Global Positioning System (GPS) technology, or location information may be provided by a wireless communication device (e.g., a cellular telephone) and associated wireless communication network.

Driving conditions 64, for example, road surface and traction estimates may be provided by anti-lock braking, traction control and chassis control system sensors. Radar, laser, ultra-sonic and video systems can provide a map of objects near the vehicle and their motion relative to the vehicle. Weather and time of day may also be monitored directly or derived from sources such as window wipers, lights and defrosters.

Driver activity 66 not directly related to driving may be monitored. Seat sensors and/or infrared sensors may sense the number and locations of passengers in the vehicle. Floor and steering wheel sensors may indicate the position of the driver's feet and hands. Video or imaging sensors may monitor head, body, hand and feet movements of the driver, and the operative states and driver usage of information, entertainment and Telematics systems may also be monitored. Other activities that are easily monitored include adjusting the radio, using a cellular telephone, obtaining navigation information, adjusting the environmental controls, and conversation level.

The workload manager 60 may also capture data directly related to vehicle operation by monitoring vehicle controls 68. While operating the vehicle 20, the driver is engaged in a number of different actions, such as, but certainly without limitation, applying the accelerator or brakes, turning the steering wheel, and using turn signals, windshield washer/wipers, window defoggers, etc. Data derived from the vehicle controls or other sensors may be used to evaluate cognitive load, for example, rate of change of the accelerator and brake, turn radius combined with vehicle speed, and electronic suspension settings are an exemplary few.

Due to the wide variation in human skill-levels, physical size, and personal preferences and tastes, there are many situations where it would be useful for the workload manager 60 to "recognize" who is attempting to enter and/or drive the vehicle. In that regard, the driver identification interface 70 may be configured as a personal portable user interface. A personal portable user interface may exist in may forms, but in essence captures preference, performance and habit data associated with a particular driver. The personal portable user interface may be encoded on a smart card, a key fob, or embedded in the vehicle to be activated by a fingerprint reader, voice recognition system, optical recognition system or other such means.

As will be appreciated, numerous sources of data exist within and about the vehicle environment that may be utilized by the workload manager 60. Several data types have been described above, others will be described in connection with the operation of the workload manager 60, and still others not specifically referred herein may be used without departing from the scope and spirit of the invention. It will be appreciated that as new technologies introduce new types and sources of data and new types and sources of information into the vehicle, the workload manager 60 may be adapted to utilize these additional sources of data.

In other words, the workload manager 60 will monitor anything of a technical nature that the driver might be touching or using in the cockpit of the vehicle so that the workload manager 60 knows as much as possible about what the driver is doing at any given moment. Further, the use of video and imaging technology, seat sensors and microphones in the cockpit allows the workload manager 60 to determine the location and position of the driver, the noise level, and the presence of passengers and other potential sources of distractions. The radar, laser, video and infra-red sensors deployed around the perimeter of the vehicle monitor traffic and weather conditions, obstacles, lane markings, etc. The driver's present condition and driving performance may be inferred from direct measures, such as video, and from comparison of current performance with past performance and known good performance practices.

Ultimately, in one embodiment, the workload manager 60 uses the available inputs to determine when the vehicle 20, and correspondingly, the vehicle or driver is in one of several states. Based on the state of the vehicle or driver, the workload manager 60 may escalate or de-escalate the level of urgency of the navigation cue. This may result in eliminating the navigation cue, providing a modified version of the navigation cue, or providing the entire navigation cue. For instance, the workload manager 60 may de-escalate the level of urgency and divert the navigation cue if it is determined that the vehicle or driver is in a demanding driving state. The workload manager 60 may also just provide an audio version of the navigation cue (stripping away any display graphics) if the vehicle or driver is in an intermediate driving state. The workload manager 60 may further escalate the level of urgency and provide the entire navigation cue if the vehicle or driver is in a steady driving state.

In order for the workload manager 60 to intelligently assess the driver's cognitive load it may attempt to determine the current state of the driver. One component of the driver state is the current effort required by the driver to perform the driving task. As examples, entering or exiting a freeway, making a lane change, turning a corner, and parking are typically considered "demanding" driving states. In contrast, cruising on a straight free-way without surrounding traffic or sitting at a stoplight are typically considered "steady" driving states. Thus, one way to characterize driver activity may be to separate the "difficult" driving states from the "steady" driving states. Further explanations of specific algorithms and methods of establishing workload manager 60 states may be found in co-pending patent application, Ser. No. 10/748,549, filed on Dec. 30, 2003, entitled "Method and Apparatus for Classifying Vehicle Operator Activity States," by Kari Torkkola, Robert Leivian, and Noel Massey, attorney's docket number AS00007, assigned commonly with the present application, the disclosure of which is hereby incorporated by reference herein in its entirety.

Figure 9:
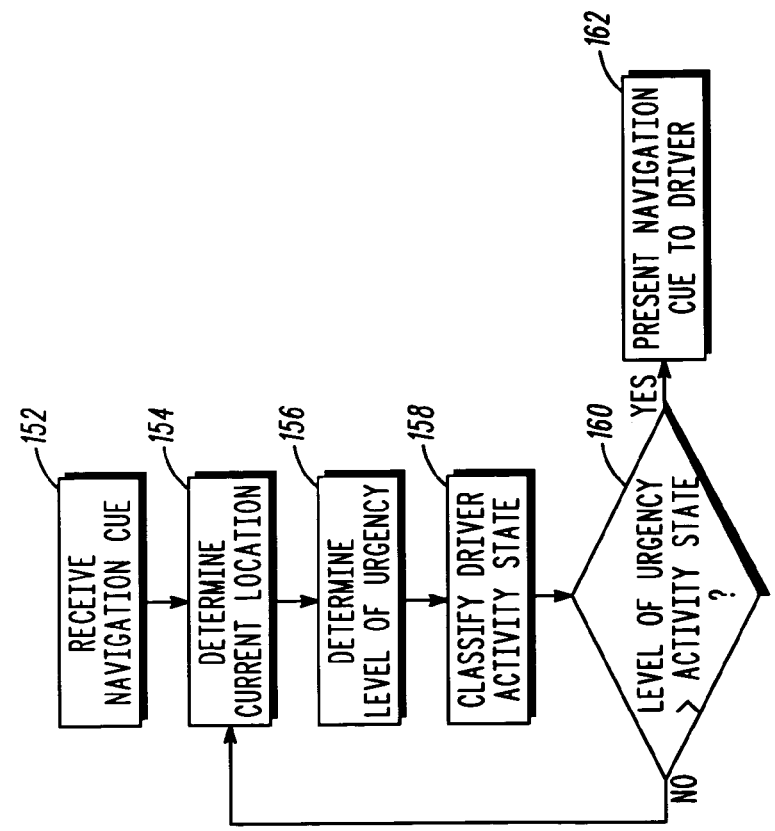

FIG. 9 illustrates a summary of the operation of the controller 22 in one embodiment that includes the workload manager 60. In process block 152, the urgency calculator 40 of the controller 22 receives a navigation cue from the navigation unit 38. As mentioned above, this navigation cue may be sent from a navigation unit 38 embedded in the vehicle or may be transmitted over a wireless communication link from a remote service center 44. The navigation cue may include data such as a location of a maneuver, the instructions associated with the maneuver, and the type of maneuver.

After the controller 22 receives the navigation cue; in block 154, in one embodiment, the urgency calculator 40 determines the current location of the vehicle 20. This can be done by receiving data from the positioning unit 36 (such as an on-board navigation system utilizing GPS technology), or location information may be provided by a wireless communication device (e.g., a cellular telephone) and associated wireless communication network.

In block 156, the urgency calculator 40 of the controller 22 will determine a level of urgency associated with the navigation cue. In one embodiment, this is done by having the urgency calculator 40 compare the current location of the vehicle 20 to the location of the maneuver in the associated data of the navigation cue. In this case, the urgency calculator 40 will assign a lower level of urgency for the navigation cue if the vehicle is located relatively far from the maneuver. As mentioned above, there are other ways to assign a level of urgency to a navigation cue including an assessment of navigation cue types, user initiated zones of familiarity, and machine initiated zones of familiarity.

At process block 158, the workload manager 60 in the controller 22 will classify the driver activity state as described above. Based on this classification, the workload manager may escalate or de-escalate the level of urgency of the navigation cue. The process then proceeds to decision block 160.

At decision block 160, the controller 22 will then determine whether the level of urgency is greater than a predetermined threshold. Again, the predetermined threshold is implementation specific and may depend on the number of devices communicating with the driver and the number of possible driver operations. If it is determined that the level of urgency is not greater than the predetermined threshold, the process will return to blocks 154, 156, 158 to determine a new level of urgency for the navigation cue. These steps advantageously allow the system to dynamically update the level of urgency associate with particular navigation cues. In this embodiment, when the level of urgency is greater than the predetermined threshold, the navigation cue is then presented to the driver as shown in process block 162.

Again, as mentioned above, when presenting a navigation cue to a driver, the system may be configured to play an associated navigation message in whole, in part, or in a modified format based on the varying level of urgency associated with the navigation cue. For instance, a particular navigation message associated with a navigation cue may be a voice, text, or graphic message. As the level of urgency escalates, the system may be configured to shorten the verbal navigation message to make it more direct or the tone and/or volume of the verbal message may be increased. Additionally, if the message is text or graphic, the color of the displayed text or graphic may change color depending on the escalation or de-escalation of the level of urgency. Moreover, the complexity of the navigation message for a particular navigation cue may be reduced and highlighted as the level of urgency escalates.

Figure 10:
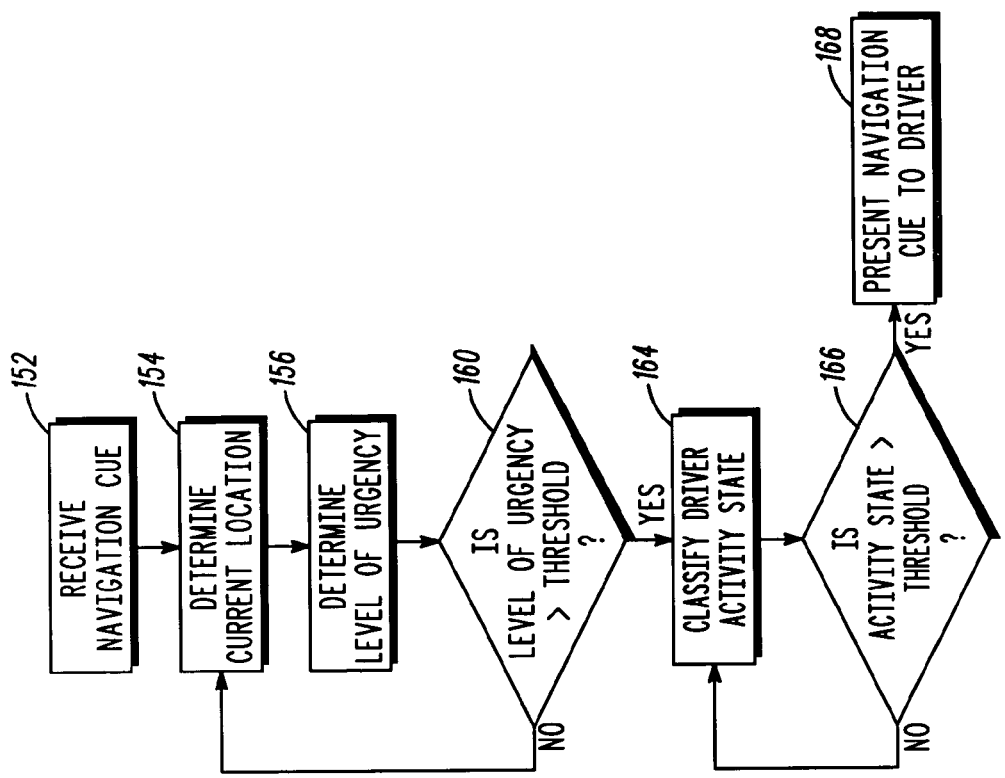
FIGS. 9–10 illustrate various other methods of the present invention for assigning a level of urgency to a navigation cue.

FIG. 10 illustrates a summary of an alternative operation of the controller 22 in another embodiment of present invention. Here, process blocks 152, 154, 156, and 160 are essentially the same as those in FIG. 9. However, if it is determined that the level of urgency is greater than a predetermined threshold, the process continues to block 164 where the controller 22 will classify the driver's activity state as described above. As mentioned above, this may be done through the addition of a workload manager 60.

At decision block 166, the process will then determine whether the driver's activity state is at or above a predetermined threshold. If so, in one embodiment, the controller 22 will pass the navigation cue to the user interface 42 for presentation to the driver (block 168). However, if the driver's activity state is not above a certain threshold, the controller 22 will return to process block 164. Alternatively, the process may eliminate the navigation cue or modify at least a portion of the navigation cue prior to sending it to the user interface 42.

What has been described are navigation systems and methods for vehicles to dynamically assign a level of urgency to navigation cues. The above description of the present invention is intended to be exemplary only and is not intended to limit the scope of any patent issuing from this application. The present invention is intended to be limited only by the scope and spirit of the following claims.

What is claimed is:

1. A system for guiding a driver of a vehicle from a starting point to a destination point, the system comprising:
   a navigation unit that is capable of selecting a route between the starting point and the destination point, the navigation unit further capable of generating a plurality of navigation cues to guide the driver along the selected route wherein each of the plurality of navigation cues include a data packet that comprises a location of a maneuver and an instruction for the maneuver;
   a positioning unit that is capable of determining a position of the vehicle;
   a controller connected to the navigation unit for receiving the navigation cues and connected to the positioning unit for receiving the position of the vehicle, the controller having an urgency calculator that is capable of assigning a level of urgency to the navigation cues received from the navigation unit based on the position of the vehicle from the positioning unit and the location of the maneuver in the data packet; and
   a user interface that presents the navigation cues to the driver based on the level of urgency of the navigation cue.

2. The system in claim 1, wherein the navigation unit is embedded in the vehicle.

3. The system in claim 1, wherein the navigation unit is located in a remote service center, the controller connected to the navigation unit through a wireless communication link.

4. A method for guiding a driver of a vehicle from a starting point to a destination point, the method comprising the steps of:
   receiving a navigation cue associated with a selected route between the starting point and the destination point wherein the navigation cue includes a data packet that comprises a location of a maneuver along the selected route and an instruction for the maneuver;
   receiving a position of the vehicle;
   assigning a level of urgency to the navigation cue based on the position of the vehicle and the location of the maneuver in the data packet;

updating the level of urgency based on an activity state of driver or vehicle;

presenting the navigation cue to the driver based on the level of urgency of the navigation cue.

5. The method in claim 4, wherein the navigation cue is generated from a navigation unit that is embedded in the vehicle.

6. The system in claim 1, wherein the controller further comprises a driver familiarity manager that is capable of determining a zone of familiarity associated with the driver of the vehicle, and the user interface further presents the navigation cues to the driver based on whether the driver is within the zone of familiarity.

7. The system in claim 6, wherein the driver of the vehicle may update the zone of familiarity manually.

8. The system in claim 6, wherein the zone of familiarity associated with the driver of the vehicle is based on stored driving habits of the driver.

9. The system in claim 1, wherein the controller further comprises a workload manager that is capable of classifying an activity state of the driver, and the user interface further presents the navigation cues to the driver based on the activity state of the driver.

10. The system in claim 9, wherein the workload manager classifies the driver into at least one activity state based upon sensor data relating to at least one vehicle operating condition.

11. The system in claim 9, wherein the workload manager classifies the driver into at least one activity state based upon sensor data relating to at least one condition of the driver.

12. The system in claim 1, wherein the presentation of the navigation cue by the user interface is altered into at least a voice only state.

13. A method for guiding a driver of a vehicle from a starting point to a destination point, the method comprising the steps of:

receiving a navigation cue associated with a selected route between the starting point and the destination point wherein the navigation cue includes a data packet that comprises a location of a maneuver along the selected route and an instruction for the maneuver;

receiving a position of the vehicle;

assigning a level of urgency to the navigation cue based on the position of the vehicle and the location of the maneuver in the data packet;

presenting the navigation cue to the driver based on the level of urgency of the navigation cue.

14. The method in claim 13, wherein the navigation cue is generated from a navigation unit that is embedded in the vehicle.

15. The method in claim 13, wherein the navigation cue is generated from a navigation unit that is located in a remote service center, the receipt of the navigation cue being done through a wireless communication link.

16. The method in claim 4, wherein the navigation cue is generated from a navigation unit that is located in a remote service center, the receipt of the navigation cue being done through a wireless communication link.

17. The method of claim 4, wherein the step of presenting the navigation cue to the driver based on the level of urgency of the navigation cue includes altering the presentation of the navigation cue into at least a voice only state.

18. The method of claim 13 further comprising the step of:

determining a zone of familiarity associated with the driver of the vehicle;

wherein the step of presenting the navigation cue to the driver is further based on whether the driver is within the zone of familiarity.

19. The method in claim 18, wherein the driver of the vehicle is capable of updating the zone of familiarity manually.

20. The method in claim 18, wherein the zone of familiarity associated with the driver of the vehicle is based on stored driving habits of the driver.

21. The method of claim 13 further comprising the step of:

classifying an activity state of the driver;

wherein the step of presenting the navigation cue to the driver is further based on the activity state of the driver.

22. The method of claim 21, wherein the workload manager classifies the driver into at least one activity state based upon sensor data relating to at least one vehicle operating condition.

23. The method of claim 21, wherein the workload manager classifies the driver into at least one activity state based upon sensor data relating to at least one condition of the driver.

24. The method of claim 13, wherein the step of presenting the navigation cue to the driver based on the level of urgency of the navigation cue includes altering the presentation of the navigation cue into at least a voice only state.

25. A system for guiding a driver of a vehicle from a starting point to a destination point, the system comprising:

a navigation unit that is capable of selecting a route between the starting point and the destination point, the navigation unit further capable of generating a plurality of navigation cues to guide the driver along the selected wherein each of the plurality of navigation cues includes a data packet that comprises a location of a maneuver and an instruction for the maneuver;

a positioning unit that is capable of determining a position of the vehicle;

a controller connected to the navigation unit for receiving the navigation cues, the controller having an urgency calculator that is capable of assigning a level of urgency to the navigation cues received from the navigation unit based on the position of the vehicle from a positioning unit and the location of the maneuver in the data packet and a workload manager that is capable of updating the level of urgency based on an activity state of driver or vehicle; and a user interface that presents the navigation cues to the driver based on the level of urgency of the navigation cue.

26. The system in claim 25, wherein the navigation unit is embedded in the vehicle.

27. The system in claim 25, wherein the navigation unit is located in a remote service center, the controller connected to the navigation unit through a wireless communication link.

28. The method of claim 4 further comprising the step of:

determining a zone of familiarity associated with the driver of the vehicle;

wherein the step of presenting the navigation cue to the driver is further based on whether the driver is within the zone of familiarity.

29. The method in claim 28, wherein the driver of the vehicle is capable of updating the zone of familiarity manually.

30. The system in claim 25, wherein the controller further comprises a driver familiarity manager that is capable of determining a zone of familiarity associated with the driver of the vehicle, and the user interface further presents the navigation cues to the driver based on whether the driver is within the zone of familiarity.

31. The system in claim 30, wherein the driver of the vehicle may update the zone of familiarity manually.

32. The system in claim 30, wherein the zone of familiarity associated with the driver of the vehicle is based on stored driving habits of the driver.

33. The system in claim 25, wherein the presentation of the navigation cue by the user interface is altered into at least a voice only state.

34. The method in claim 28, wherein the zone of familiarity associated with the driver of the vehicle is based on stored driving habits of the driver.

* * * * *